United States Patent
Grattan

(10) Patent No.: US 10,189,503 B2
(45) Date of Patent: Jan. 29, 2019

(54) VEHICLE BODY STRUCTURE

(71) Applicant: Nissan North America, Inc., Franklin, TN (US)

(72) Inventor: Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 64 days.

(21) Appl. No.: 15/404,334

(22) Filed: Jan. 12, 2017

(65) Prior Publication Data

US 2018/0194399 A1    Jul. 12, 2018

(51) Int. Cl.
| | | |
|---|---|---|
| *B60N 99/00* | (2006.01) | |
| *B62D 21/15* | (2006.01) | |
| *B62D 21/05* | (2006.01) | |
| *B62D 21/02* | (2006.01) | |

(52) U.S. Cl.
CPC ........... *B62D 21/152* (2013.01); *B62D 21/02* (2013.01); *B62D 21/05* (2013.01); *B60Y 2306/01* (2013.01); *B60Y 2410/124* (2013.01)

(58) Field of Classification Search
CPC .... B62D 21/152; B62D 29/007; B62D 21/03; B62D 21/05; B62D 29/04; B60Y 2306/01; B60Y 2410/124

See application file for complete search history.

(56) References Cited

U.S. PATENT DOCUMENTS

| | | |
|---|---|---|
| 7,819,218 B2 | 10/2010 | Eichberger et al. |
| 8,398,153 B1 | 3/2013 | Dandekar et al. |
| 8,764,096 B2 | 7/2014 | Han et al. |
| 8,985,258 B1 | 3/2015 | Midoun et al. |
| 8,985,671 B1 | 3/2015 | Lei et al. |
| 9,056,634 B2 | 6/2015 | Watanabe |
| 9,061,713 B2 * | 6/2015 | Hashimoto .......... B62D 21/152 |
| 9,067,549 B2 | 6/2015 | Baccouche et al. |
| 9,079,619 B2 | 7/2015 | Gupta et al. |
| 9,193,318 B2 | 11/2015 | Barbat et al. |
| 9,211,915 B2 * | 12/2015 | Abe .................... B62D 21/152 |
| 9,233,716 B2 | 1/2016 | Midoun et al. |
| 9,266,485 B2 | 2/2016 | Kuriyama et al. |
| 9,272,678 B2 | 3/2016 | Nam et al. |

(Continued)

FOREIGN PATENT DOCUMENTS

DE    102013003911 A1    9/2014

*Primary Examiner* — Lori L Lyjak
(74) *Attorney, Agent, or Firm* — Global IP Counselors, LLP

(57) ABSTRACT

A vehicle body structure includes a front side member, a body attachment structure and an off-center impact structure. The front side member defines a hollow interior, an outboard wall and an inboard wall. The body attachment structure is attached to the outboard wall of the front side member. The off-center impact structure has a first end portion, a second end portion and a main section extending from the first end portion to the second end portion. The first end portion extends through an outboard forward opening and into the hollow interior of the front side member and is rigidly connected to the front side member forward of the body attachment structure. The second end portion is attached to the front side member at a location rearward of the body attachment structure with the main section extending outboard of the body attachment structure.

18 Claims, 9 Drawing Sheets

(56) References Cited

U.S. PATENT DOCUMENTS

| | | |
|---|---|---|
| 9,290,138 B2 * | 3/2016 | Muraji ................. B62D 21/152 |
| 9,394,003 B2 * | 7/2016 | Matsumoto ............ B62D 21/02 |
| 9,415,805 B2 | 8/2016 | Fujikawa et al. |
| 9,676,416 B2 * | 6/2017 | Kitakata .............. B62D 21/152 |
| 9,771,106 B2 * | 9/2017 | Ogawa ................ B62D 21/152 |
| 9,855,971 B2 * | 1/2018 | Daido .................. B62D 21/152 |
| 2008/0023954 A1 | 1/2008 | Eichberger et al. |
| 2015/0021935 A1 | 1/2015 | Baccouche et al. |
| 2015/0298742 A1 | 10/2015 | Ono et al. |
| 2015/0360633 A1 | 12/2015 | Nishida et al. |

* cited by examiner

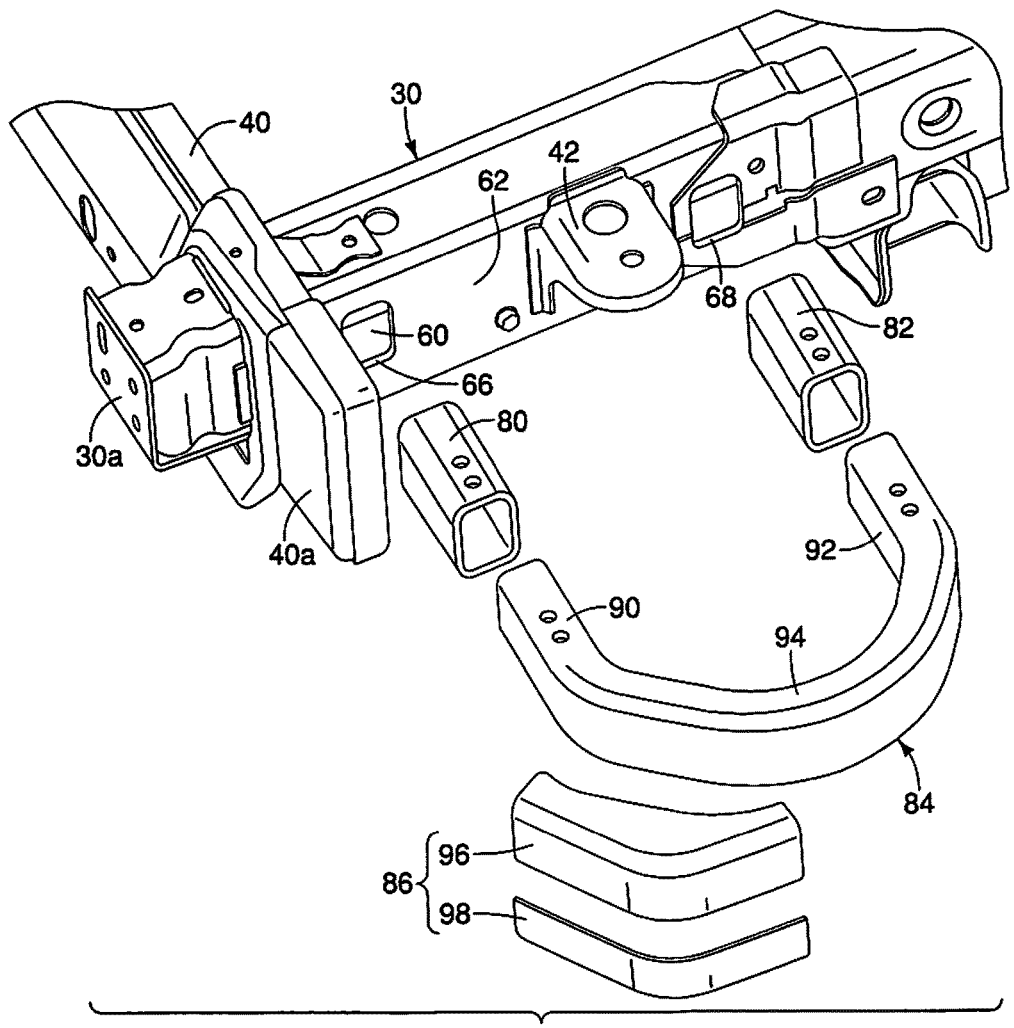
FIG. 11
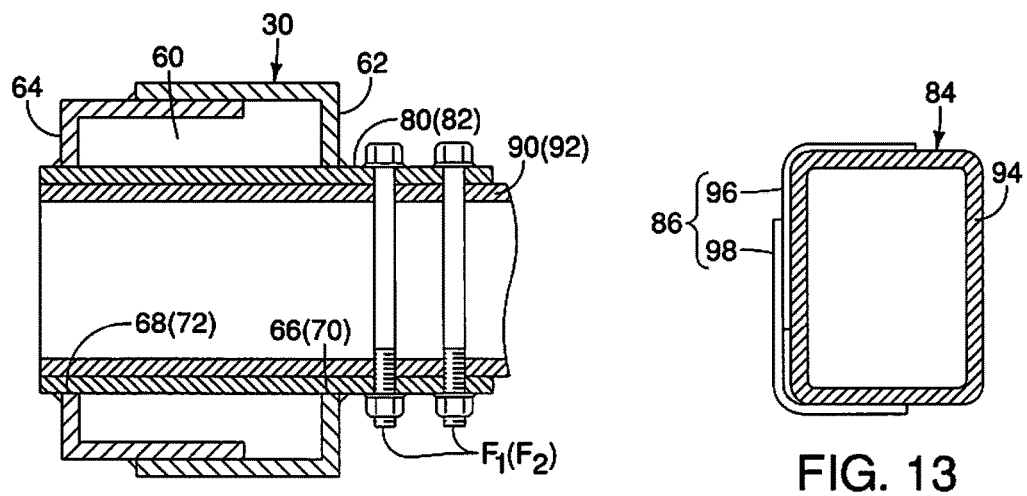
FIG. 12
FIG. 13

VEHICLE BODY STRUCTURE

BACKGROUND

Field of the Invention

The present invention generally relates to a vehicle structure. More specifically, the present invention relates to an off-center support structure attached to portions of a vehicle frame that responds to and absorbs impact force during an off-center impact test.

Background Information

Vehicle structures are routinely being redesigned to include structural features that absorb impact forces in response to impact events. Recently introduced impact event tests include an off-center impact test (also referred to as a small overlap test) where a vehicle is provided with velocity in a vehicle longitudinal direction (forward momentum) such that a front corner of the vehicle (approximately 25 percent of the overall width of the vehicle) impacts a fixed, rigid barrier. FIGS. 1, 2 and 3 schematically show an example of a conventional vehicle C undergoing an impact event with a fixed barrier B in accordance with the off-center impact test.

FIG. 1 shows the conventional vehicle C approaching the rigid barrier B in the off-center impact test. FIG. 2 shows the conventional vehicle C just after initial impact with the rigid barrier B showing initial deformation and forward momentum being transformed into rotational displacement about the rigid barrier B. FIG. 3 shows the conventional vehicle C undergoing further deformation and rotation as a result of the impact event.

SUMMARY

One object of the disclosure is to provide a vehicle frame with additional structural elements that absorb and redirect impact energy during an off-center impact test.

In view of the state of the known technology, one aspect of the present disclosure is to provide a vehicle body structure with a front side member, a body attachment structure and an off-center impact structure. The front side member has a front end and a front-section extending rearward from the front end. The front side member defines a hollow interior and extends in a vehicle longitudinal direction. The front side member has an outboard wall and an inboard wall with an outboard forward opening extending through the outboard wall to the hollow interior. The body attachment structure is attached to the outboard wall of the front side member along the front-section rearward of the outboard forward opening. The off-center impact structure has a first end portion, a second end portion and a main section extending from the first end portion to the second end portion. The first end portion extends through the outboard forward opening and into the hollow interior of the front side member and is rigidly connected to the front side member forward of the body attachment structure. The second end portion is attached to the front side member at a location rearward of the body attachment structure. The main section extends around and outboard of the body attachment structure.

BRIEF DESCRIPTION OF THE DRAWINGS

Referring now to the attached drawings which form a part of this original disclosure:

FIG. 11 is an exploded perspective view of the driver's front side of the frame and the off-center impact structure, showing details of the off-center impact structure including a first sleeve, a second sleeve and a main body in accordance with the first embodiment;

FIG. 12 is a cross-sectional view of a portion of the off-center impact structure taken along the line 12-12 in FIG. 10, showing the first sleeve extending through openings formed in a front side member of the frame structure, with a first end portion of the main body installed in the first sleeve in accordance with the first embodiment;

FIG. 13 is a cross-sectional view of a portion of the main body of the off-center impact structure taken along the line 13-13 in FIG. 10, in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 4-10, a vehicle 10 is illustrated in accordance with a first embodiment. The vehicle 10 is provided with an off-center impact structure 12 (shown in FIGS. 8-10) that is configured to absorb and re-direct forces during an impact event such as an off-center impact test (also referred to as a small overlap test) described further below.

Figure 1:
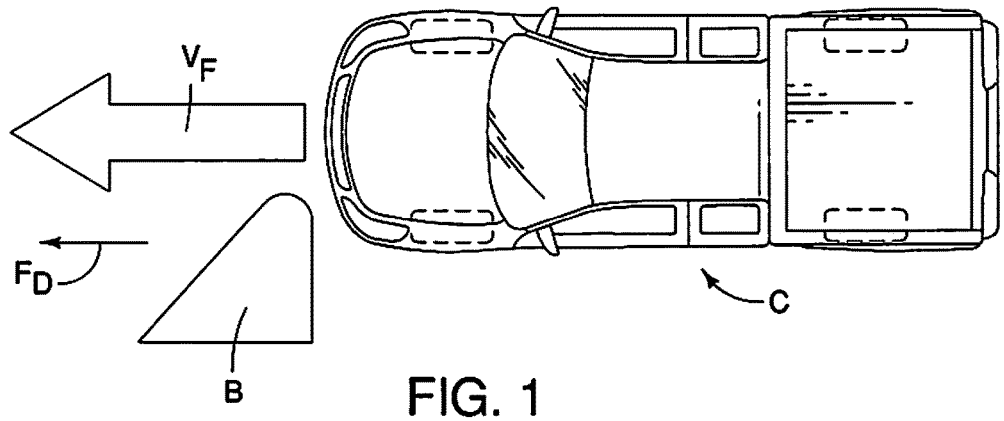
FIG. 1 is a schematic view of a conventional moving vehicle showing its response to a small overlap test where a front corner of the vehicle is aligned with a fixed, rigid barrier for eventual impact with the barrier.
Figure 2:
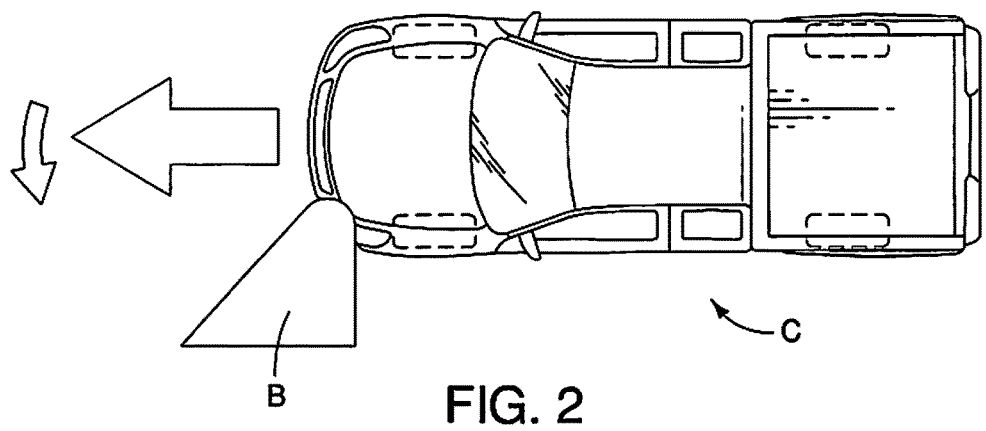
FIG. 2 is another schematic view of the conventional vehicle showing its response to the small overlap test at the beginning of an impact event with the front corner of the conventional vehicle impacting the barrier and beginning to undergo deformation.
Figure 3:
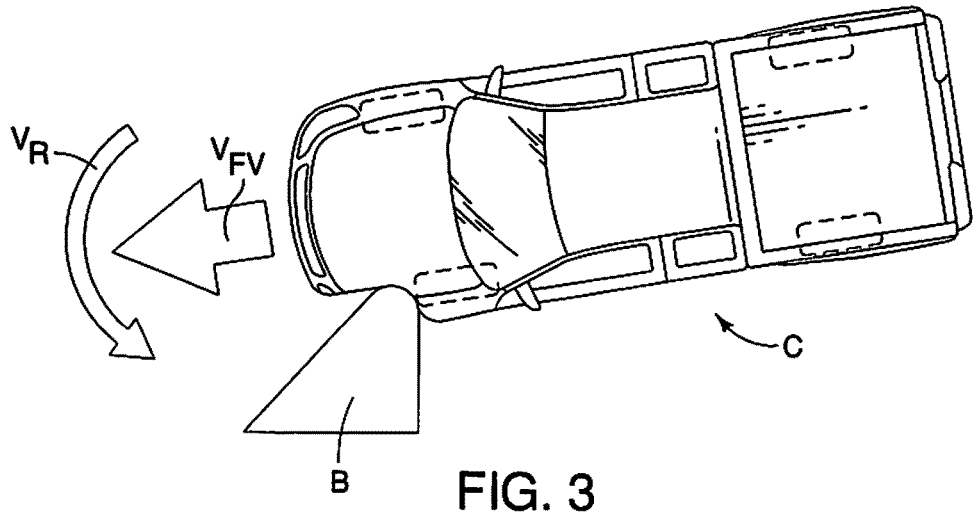
FIG. 3 is still another schematic view of the conventional vehicle showing its response to the small overlap test with the conventional vehicle undergoing further deformation during the impact event.

The Insurance Institute for Highway Safety (IIHS) has developed various tests where vehicles are provided with forward velocity $V_F$ and impacted against fixed, rigid barriers, like the rigid barrier B depicted in FIGS. 1-3, In the IIHS offset tests, the conventional vehicle C is aimed at the rigid barrier B such that approximately 25 percent of the front area of the conventional vehicle C impacts the rigid barrier B. In other words, as indicated in FIGS. 1-3, only a front corner of the conventional vehicle C impacts the rigid barrier B. This IIHS test is also known as a frontal offset, narrow offset, or small overlap test. In such tests, a front bumper assembly of the conventional vehicle C is either not impacted, or, undergoes only limited contact with the rigid barrier B during the impact event. Therefore, other structures at the front of the conventional vehicle C impact the rigid barrier B and absorb at least some of the kinetic energy associated with the rapid deceleration of the vehicle C that results from the impact event. When the vehicle C is provided with velocity and impacts the rigid barrier B, the rapid deceleration of the vehicle C transforms the kinetic energy associated with the mass times velocity of the vehicle C into deformation of the vehicle C and counter movement of the vehicle C. As is well known, kinetic energy is a function of mass times velocity. During the small offset test, the kinetic energy of the vehicle C is partially absorbed and partially transformed into other forms of kinetic energy, such as rotary motion. It should be understood that the kinetic energy associated with the forward velocity of the vehicle C (and in the description below) is transformed into an impacting force upon impact due to the rapid deceleration of the vehicle C. Consequently, hereinbelow, the terms impact force and impacting force as used herein correspond to the kinetic energy applied to the vehicle 10 during the small overlap test (the impact event), as described below with respect to the various embodiments.

The test developed by the IIHS is represented schematically in FIGS. 1-3. During the impact event, a variety of structures undergo deformation. This deformation is not explicitly depicted in FIGS. 2 and 3 with any degree of accuracy because such deformation varies from conventional vehicle to conventional vehicle, depending upon the overall design of the front structure of the conventional vehicle C. Instead, in FIG. 3, the conventional vehicle C is depicted with a generic degree of deformation as a result of the impact event. However, the conventional vehicles tested by the IIHS using the small overlap test have a relatively consistent response in that during the impact event with the rigid barrier B, the rear end R of the conventional vehicle C undergoes some rotation and swings laterally away from the rigid barrier B, as indicated in FIG. 3.

In other words, the forward velocity $V_F$ of the conventional vehicle C as it moves is transformed upon impact with the rigid barrier B. The velocities $V_{FV}$ and $V_R$ are the result of an equal and opposite reaction force acting on the vehicle C as the vehicle C suddenly decelerates. It is desirable to move the vehicle laterally outward from the barrier and avoid unnecessary loading of the dash-wall and/or A-pillar.

Figure 4:
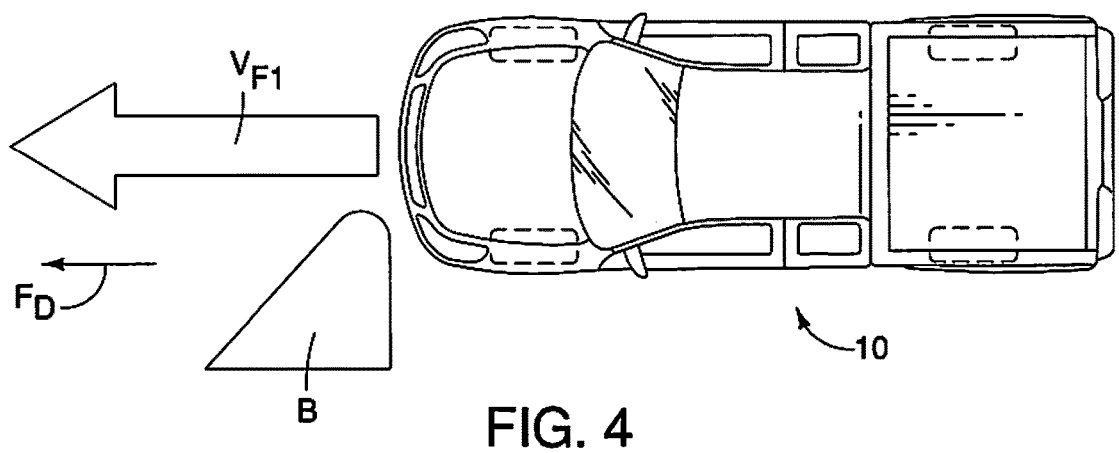
FIG. 4 is a schematic view of a moving vehicle being subjected to a small overlap test where approximately 25 percent of the front of the vehicle aligned with a fixed, rigid barrier for eventual impact with the barrier in accordance with a first embodiment.
Figure 5:
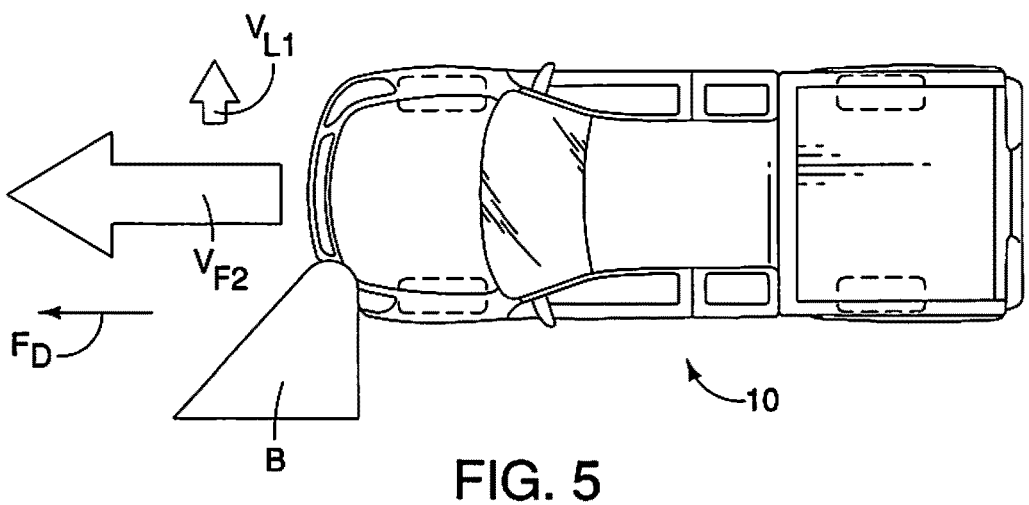
FIG. 5 is another schematic view of the vehicle depicted in FIG. 4 showing an initial response to the impact event of the small overlap test with a front corner of the vehicle impacting the barrier and beginning to undergo deformation in accordance with the first embodiment.
Figure 6:
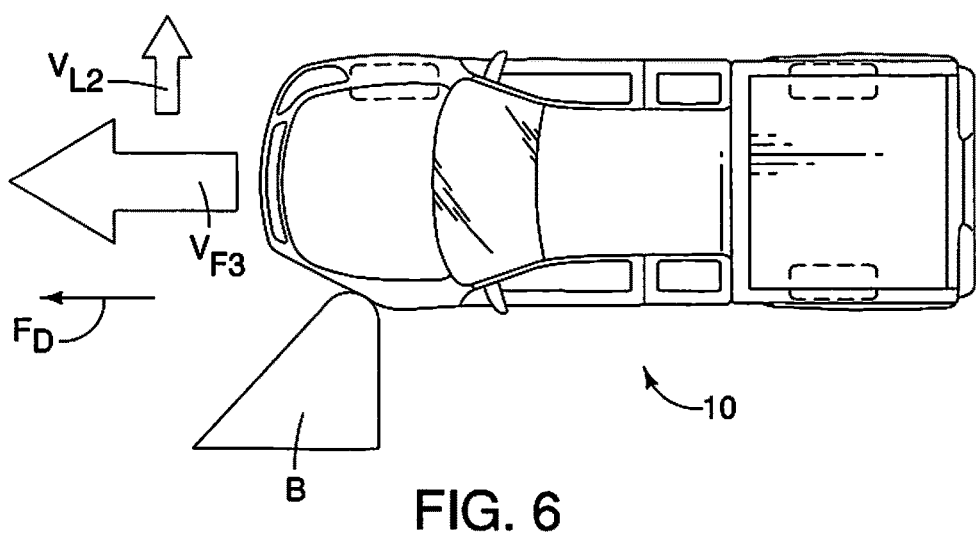
FIG. 6 is still another schematic view of the vehicle depicted in FIGS. 4 and 5 showing a subsequent response to the impact event of the small overlap test with the moving vehicle undergoing further deformation during the impact event in accordance with the first embodiment.

The force directing features of the off-center impact structure 12 of the vehicle 10 as described hereinbelow are such that during an impact event (such as a small overlap test), the impact forces are absorbed and transmitted to various structures within the vehicle 10, as shown in FIGS. 4, 5 and 6. Specifically, in FIG. 4 the vehicle 10 is provided with a forward velocity $V_{F1}$ and is subjected to a small overlap test where approximately 25 percent of the front of the vehicle is aligned with the rigid barrier B. In FIG. 5 the vehicle 10 undergoes an initial response to the impact event of the small overlap test with a front corner of the vehicle impacting the barrier and beginning to undergo deformation. Hence, the forward velocity $V_{F1}$ is reduced to a velocity $V_{F2}$ with some of the impact energy causing the vehicle 10 to move laterally with a velocity $V_{L1}$, as shown in FIG. 5. In FIG. 6, the vehicle 10 undergoes a subsequent response to the impact event in that one or more of the features of the off-center impact structure 12 has functioned properly and caused the vehicle 10 to move laterally with the forward velocity $V_{F2}$ is reduced to a velocity $V_{F3}$ and a lateral velocity $V_{L2}$ that is greater than the $V_{L1}$. In other words, the off-center impact structure 12 is configured to absorb impact energy and direct that force to various portions of the vehicle, and the off-center impact structure 12 is also configured to move the vehicle 10 in a lateral direction away from the barrier B.

It should be understood from the drawings and the description herein, that during an impact event, such as the small overlap test, the reaction forces experienced by the vehicle 10 as it impacts the rigid barrier B are significant. These significant reaction forces are exponentially greater than the forces the structures of the vehicle 10 undergo during normal operating usage of the vehicle 10. In other words, the impact events referred to herein are intended as destructive tests. Further, the impact events of the small overlap tests are configured such that the vehicle 10 impacts the rigid barrier B at portions of the vehicle 10 outboard of some of the vehicle's structures (not a central area of the vehicle 10), as described in greater detail below.

In the various embodiments described below, the vehicle 10 includes combinations of features of the off-center impact structure 12 shown in FIGS. 9 and 10, and described further below.

Figure 7:
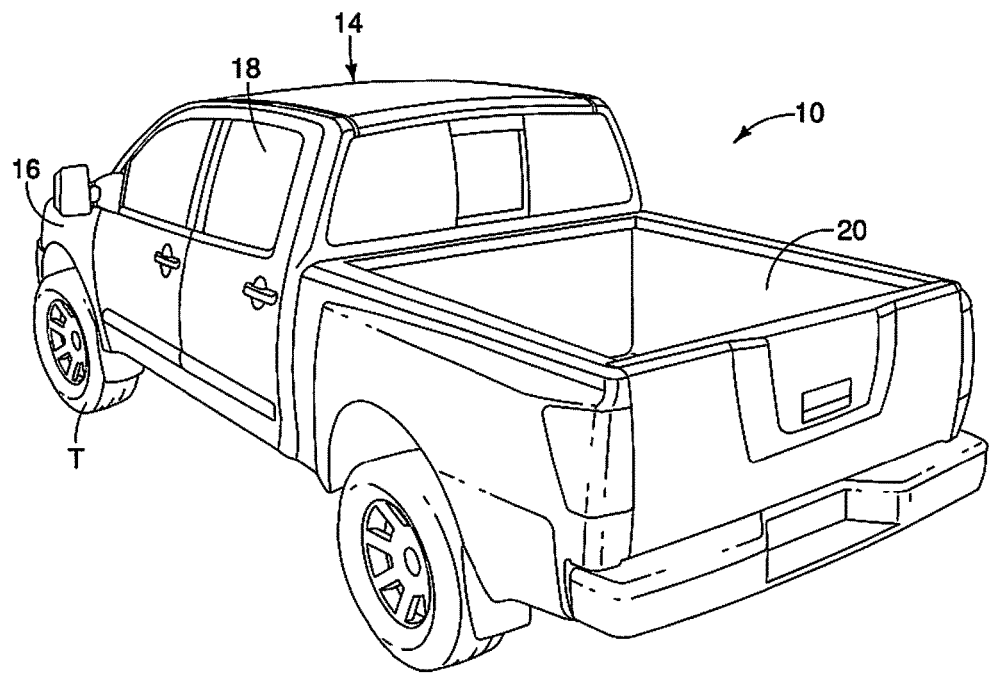
FIG. 7 is a perspective view of the vehicle having an off-center impact structure in accordance with the first embodiment.

FIG. 7 shows one embodiment of the vehicle 10. In FIG. 7, the vehicle 10 is depicted as a pickup truck that includes a body structure 14 that defines, for example. an engine compartment 16, a passenger compartment 18 and a cargo area 20. The body structure 14 is installed to and rests on a frame 22. The frame 22 is shown removed from the vehicle 10 in FIGS. 8 and 9. Specifically, FIG. 8 shows the frame 22 with the off-center impact structure 12 installed thereto, and FIG. 9 shows only a front area of the frame 22 with the off-center impact structure 12 installed thereto.

In FIG. 7, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and the description herein, that the frame 22 and the off-center impact structure 12 described below can be configured for smaller vehicles or larger vehicles and is not limited to usage in a heavy-duty vehicle such as the vehicle 10. In other words, the off-center impact structure 12 can be used on any size vehicle that includes a frame such as the frame 22 where the body structure 14 attaches to and is supported by the frame 22. It should also be understood from the drawings and description, that the off-center impact structure 12 can also be employed with a unibody vehicle. A unibody vehicle is a vehicle that does not typically includes a separate frame such as the frame 22. Rather, the unibody vehicle includes various structural elements welded together. Elements of the unibody vehicle serve as frame elements functionally equivalent to the elements of the frame 22. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 22 (described in greater detail below). U.S. Pat. No. 9,180,913, also assigned to Nissan North America, also discloses a unibody vehicle body structure and further discloses an engine cradle. The elements of the off-center impact structure 12 can be installed to portions of the unibody vehicle disclosed in U.S. Pat. No. 8,870,267 and portions of the engine cradle of U.S. Pat. No. 8,870,267. Both U.S. Pat. Nos. 8,870,267 and 9,180,913 are incorporated herein by reference in their entirety. Since unibody vehicles are conventional structures, further description is omitted for the sake of brevity.

Figure 8:
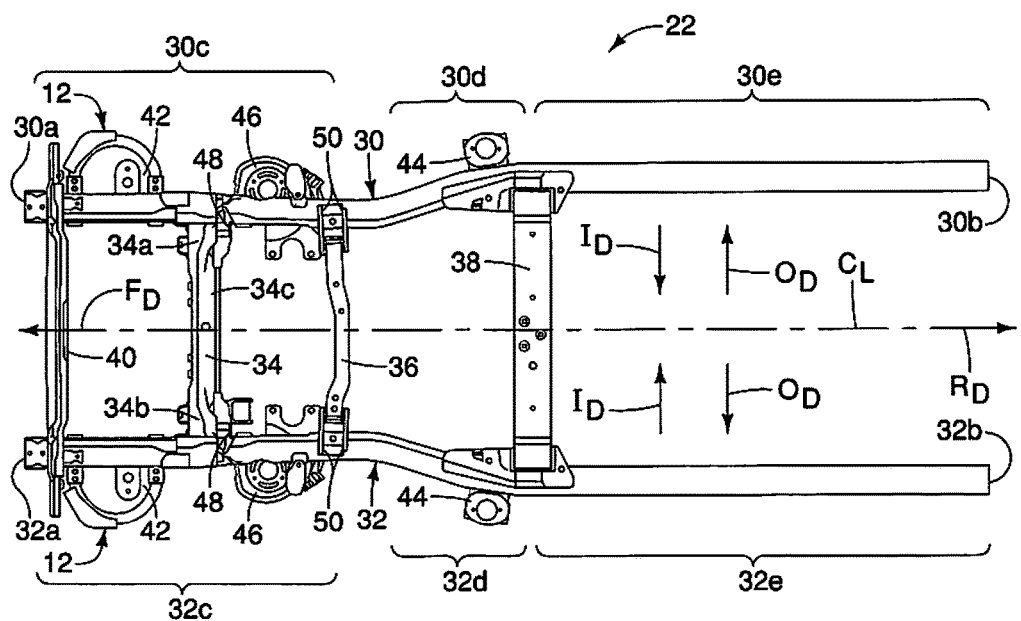
FIG. 8 is a bottom view (looking upward) of a frame from the vehicle depicted in FIG. 7, showing two of the off-center impact structures attached to respective a front side members at either side of the frame in accordance with the first embodiment.
Figure 9:
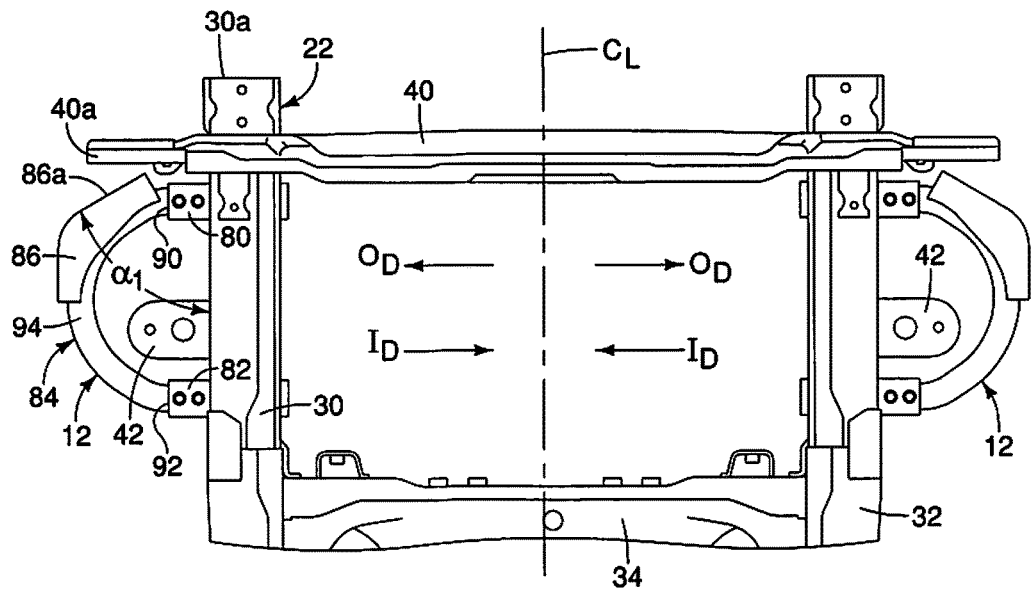
FIG. 9 is a top view (looking downward) of a portion of the frame depicted in FIG. 8, with the off-center impact structure installed to the frame structure in accordance with the first embodiment.
Figure 10:
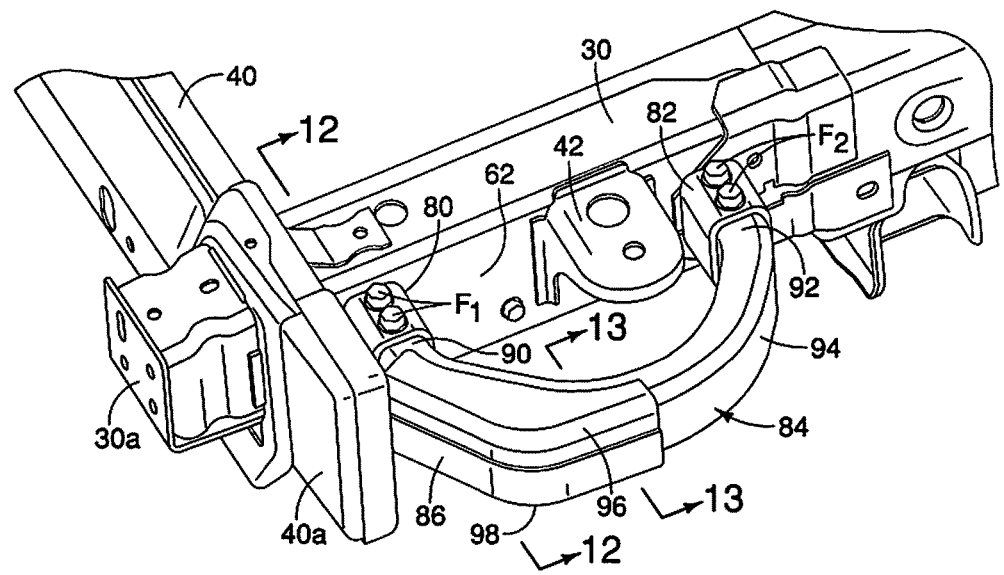
FIG. 10 is a perspective view of a driver's front side of the frame and the off-center impact structure, showing details of the off-center impact structure in accordance with the first embodiment.

The off-center impact structure 12 is shown in FIGS. 8 and 9 installed to specific portions of the frame 22.

In FIG. 8 several directions relative to the frame 22 (and the vehicle 10) are shown in order to define orientations of the various features of the vehicle 10 and the off-center impact structure 12. Specifically, the vehicle 10 and the frame 22 define a longitudinal center line $C_L$ that extends in a lengthwise direction of the vehicle 10 along a central portion of the vehicle 10. At a left-hand side of FIG. 8, a forward direction $F_D$ is indicated by the depicted arrow, and at a right-hand side of FIG. 8 a rearward direction $R_D$ is indicated by the depicted arrow. As well, inboard directions $I_D$ and outboard directions $O_D$ relative to the longitudinal center line $C_L$ are also shown in FIG. 8.

As shown in FIG. 8, the frame 22 includes a first side member 30, a second side member 32, a first cross-member 34, a second cross-member 36 and a third cross-member 38 and a front cross-member 40. FIG. 8 shows an underside of the frame 22. In other words, the depiction of the frame 22 is taken from below the frame 22 looking upward. The frame 22 is made of heavy gauge steel, but can alternatively be made of other materials depending upon the overall design of the vehicle 10. It should therefore be understood that the first side member 30 extends along and under a driver's side of the vehicle 10, and the second side member 32 extends along and under a passenger's side of the vehicle 10.

The first side member 30 is an elongated beam (a first side member) that has multiple contours and shapes. Specifically, the first side member 30 has a front end 30a and a rear end 30b. The first side member 30 also has a first portion 30c, a second portion 30d and a third portion 30e. The first portion 30c extends in the rearward direction $R_D$ from the front end 30a to a location proximate the second cross-member 36. The first portion 30c is generally straight. The second portion 30d has a curved shape such that just rearward of the first portion 30c, the second portion 30d gradually curves in the outboard direction $O_D$. The third portion 30e is generally straight, but can include contours and curves, depending upon the overall design of the vehicle 10.

Similarly, the second side member 32 is an elongated beam (a second side member) that has multiple contours and shapes that are symmetrical to the first side member 30. Specifically, the second side member 32 has a front end 32a and a rear end 32b. The second side member 32 also has a first portion 32c, a second portion 32d and a third portion 32e. The first portion 32c extends in the rearward direction $R_D$ from the front end 32a to a location proximate the second cross-member 36. The first portion 32c is generally straight. The second portion 32d has a curved shape such that just rearward of the first portion 32c, the second portion 32d gradually curves in the outboard direction $O_D$.

The first portions 30c and 32c of the first and second side members 30 and 32 are a first distance away from one another, and the third portions 30e and 32e are a second distance away from one another, with the second distance being greater than the first distance.

The first and second side members 30 and 32 each include body attachment structures 42 and 44 (also referred to as attachment flanges). The body attachment structures 42 and 44 are welded to the first and second side members 30 and 32 and are dimensioned and shaped to attach to the body structure 14 of the vehicle 10. The body attachment structures 42 extend from outboard sides of the first portions 30c and 32c of the first and second side members 30 and 32 forward of the first cross-member 34. The body attachment structures 44 extend from outboard sides of the second portions 30d and 32d of the first and second side members 30 and 32 rearward of the second cross-member 36.

Although not shown in FIG. 8, the third portions 30e and 32e of the first and second side members 30 and 32 can also include additional body attachment structures configured for attachment to structures that define the cargo area 20 of the vehicle 10. Further, the third portions 30e and 32e can be at the same level above the ground as the first portions 30c and 32c, or can be raised above the ground at a level higher that the first portions 30c and 32c, with the second portions 30d and 32d including an upward curvature.

As shown in FIG. 8, each of the first portions 30c and 32c of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 are defined by pairs of flanges welded to lower surfaces of the first and second side members 30 and 32. Similarly, the second suspension structures 50 are defined by pairs of flanges welded to lower surfaces of the first and second side members 30 and 32 rearward and spaced apart from the first suspension structures 48. The first suspension structures 48 are adjacent to or aligned with the first cross-member 34. The second suspension structures 50 are adjacent to or aligned with the second cross-member 36.

The first suspension structures 48 and the second suspension structures 50 are configured to support a lower control arm (not shown) for pivotal movement about pivot bolts 54. The lower control arm is part of the steering and suspension structure of the vehicle 10. Since steering and suspension structures (and, in particular, control arm structures) are conventional vehicle components, further description is omitted for the sake of brevity.

The engine compartment 16 of the body structure 14 is approximately located in the space above and between the first portions 30c and 32c of the first and second side members 30 and 32. A front portion of the passenger compartment 18 is located in the space above and between the second portions 30d and 32d of the first and second side member rearward of the engine compartment 16. The remainder of the passenger compartment 18 and the cargo area 20 of the body structure 14 are located above the third portions 30e and 32e of the first and second side members 30 and 32.

As shown in FIGS. 8 and 9, the first cross-member 34 is rigidly attached to the first side member 30 and rigidly attached to the second side member 32. The first cross-member 34 can be co-planar with the first and second side members 30 and 32, or can be located above or below the first and second side members 30 and 32. The first cross-member 34 has a first end 34a, a second end 34b and mid-section 34c that extends from the first end 34a to the second end 34b. The first end 34a of the first cross-member is fixed to the first side member 30.

In the depicted embodiment, the first cross-member 34 extends in a vehicle lateral direction from the first portion 30c of the first side member 30 to the first portion 32c of the second side member 30 at a location rearward of the front ends 30a and 32a. The first cross-member 34 is further rigidly fixed to each of the first side member 30 and the second side member 32. As shown in FIGS. 8 and 9, the first cross-member 34 extends perpendicular to the first portion 30c of the first side member 30 and the first portion 32c of the second side member 32.

The second end 34b of the first cross-member 34 is also fixed to the second side member 32 in a manner consistent with the attachment of the first end 34a to the first side member 30. Since the attachment of the second end 34b to the second side member 32 is basically the same as the attachment of the first end 34a to the first side member 30, further description of the attachment of the first cross-member 34 to the second side member 32 is omitted for the sake of brevity.

The second cross-member 36 extends in the vehicle lateral direction and is rigidly fixed to areas of each of the first side member 30 and the second side member 32 rearward of the first cross-member 34. The second cross-member 36 can be welded to each of the first portions 30c and 32c of the first and second side members 30 and 32. However, the second cross-member 36 can be attached to the first and second side members 30 and 32 via mechanical fasteners (not shown).

An engine receiving space is defined in the area confined between the first and second cross-members 30 and 32, and between the first and second side members 34 and 36.

The third cross-member 38 extends between forward ends of each of the third portions 30e and 32e of the first and second side members 30 and 32. The third cross-member 38 is welded to each of the first and second side members 30 and 32 and can serve as an attachment structure for a rear portion of the body structure 14 (at a mid-portion of the passenger compartment 18), and/or can serve as an attachment structure for the structure that defines the cargo area 20.

The front cross-member 40 is welded or otherwise rigidly fixed to the front ends 30a and 32a of the first and second side members 30 and 32. A bumper structure (not shown) can be attached to the front cross-member 40. Alternatively, the bumper structure (not shown) can be attached to the front ends 30a and 32a of the first and second side members 30 and 32 replacing the front cross-member 40.

A description of the off-center impact structure 12 is now provided with specific reference to FIGS. 9-13. In the depicted embodiment as shown in FIG. 11, the front side member 30 defines a hollow interior 60. As is shown in FIGS. 8 and 9, one of the off-center impact structures 12 is installed to the front side member 30 and another one of the off-center impact structures 12 is installed to the front side member 32. The two off-center impact structures 12 are symmetrically arranged relative to the longitudinal center line $C_L$ of the vehicle 10. The two off-center impact structures 12 are basically identical, except that they are mirror images of one another. Consequently, description of one of the off-center impact structures 12 applies equally to the other. Therefore, only one of the off-center impact structures 12 is described herein below for the sake of brevity.

The first portion 30c (also referred to as the front-section) of the front side member 30 extends in a rearward direction from the front end 30a of the front side member in a vehicle longitudinal direction parallel to the longitudinal center line $C_l$. As shown in FIG. 12, the front side member 30 has an outboard wall 62 and an inboard wall 64.

The outboard wall 62 defines an outboard forward opening 66 that extends through the outboard wall 62 and to the hollow interior 60. The outboard wall 62 also defines an outboard rearward opening 68 that extends through the outboard wall 62 and to the hollow interior 60.

The inboard wall 64 of the front side member 30 defines an inboard forward opening 70 aligned with the outboard forward opening 66 relative to the inboard direction $I_D$ and the outboard direction $O_D$ (lateral directions) of the front side member 30. Further, the inboard wall 64 of the front side member 30 has an inboard rearward opening 72 aligned with the outboard rearward opening 68.

As shown in FIG. 11, the outboard forward opening 66 and the inboard forward opening 70 are located forward of the body attachment structure 42. Further, the outboard rearward opening 68 and the inboard rearward opening 72 are located adjacent to but rearward of the body attachment structure 42. The body attachment structure 42 is attached to the outboard wall 62 of the front side member 30 along the front portion 32 (the front-section) rearward of the outboard forward opening 66 via, for example, welding techniques.

The front cross member 40 is attached to the front side member 30 at or adjacent to the front end 30a of the front side member 30. The front cross member 40 includes an outboard portion 40a that extends from the front side member 30 forward of the off-center impact structure 12 in the outboard direction $O_D$. In response to an impact event of an off-center impact test, the outboard portion 40a of the front cross member deforms contacting the off-center impact structure and further causing the front section of the front side member to break away from a rearward portion of the front side member or deform in an outboard direction relative to the rearward portion of the front side member pushing the front side member in a lateral direction away from an area of impact.

The off-center impact structure 12 basically includes a first sleeve 80, a second sleeve 82, a main body 84 and a reinforcement member 86.

The first sleeve 80 is a hollow beam member having a hollow interior open at opposing ends. The first sleeve 80 is inserted through the first side member 30 with a portion extending laterally outward in the outboard direction $O_D$ from the outboard wall 62. The first sleeve 80 basically defines a tunnel through the first side member 30. Specifically, the first sleeve 80 extends through the outboard forward opening 66, through the hollow interior 60 and through the inboard forward opening 70. The first sleeve 80, like the front side member 30, is preferably made of a metallic material such as steel and is fixedly attached to the outboard wall 62 and the inboard wall 64. For example, the first sleeve 80 can be welded to the outboard wall 62 and welded to the inboard wall 64, but can alternatively be attached to the front side member 30 via mechanical fasteners.

The second sleeve 82 is also a hollow beam member (like the first sleeve 80) and has a hollow interior open at opposing ends. The second sleeve 82 is inserted through the first side member 30 with a portion extending laterally outward in the outboard direction $O_D$ from the outboard wall 62. The second sleeve 82 basically defines a tunnel through the first side member 30. Specifically, the second sleeve 82 extends through the outboard rearward opening 68, through the hollow interior 60 and through the inboard rearward opening 72. The second sleeve 82 is also preferably made of a metallic material such as steel and is fixedly attached to the outboard wall 62 and the inboard wall 64. For example, the second sleeve 82 can be welded to the outboard wall 62 and welded to the inboard wall 64, but can alternatively be attached to the front side member 30 via mechanical fasteners.

The main body 84 of the off-center impact structure 12 has a first end portion 90, a second end portion 92 and a main section 94. The main body 84 has an overall U-shape with the main section 94 having a semicircular shape that arcuately extends from the first end portion 90 to the second end portion 92.

The main body 84 is made of a metallic material but can be made of alternative materials, such as polymer materials, plastic materials and/or composite materials that provide similar rigidly and impact response characteristics as metal or steel. The main body extends from the first end portion 90 to the second end portion 92. The first end portion 90 and the second end portion 92 are straight. The entire main body 84 is basically a hollow beam structure that can be formed as a single element, or can be a series of plate members welded or otherwise adhered to one another defining the depicted shape.

A portion of the first end portion 90 is inserted into the first sleeve 80 such that the first end portion 90 extends through the outboard forward opening 66 and into the hollow interior 60 of the front side member 30. As shown in FIG. 12, the first end portion 90 extends all the way through the first sleeve 80, and extends through the inboard forward opening 70. Alternatively, it is possible to insert the first end portion 90 into the first sleeve 80 such that the first end portion 90 does not extend to the inboard forward opening 70. The first end portion 90 is rigidly connected to the front side member 30 forward of the body attachment structure 42 via removable fasteners $F_1$. The fasteners $F_1$ extend through apertures in the first end portion 90 and through the exposed portion of the first sleeve 80. Since the first sleeve 80 is welded to the front side member 30, the first end portion 90 of the off-center impact structure 12 is connected to the front side member 30.

A portion of the second end portion 92 is inserted into the second sleeve 82 such that the second end portion 92 extends through the outboard rearward opening 72 and into the hollow interior 60 of the front side member 30. As shown in FIG. 12, the second end portion 92 extends all the way through the second sleeve 82, and through the inboard rearward opening 72. Alternatively, it is possible to insert the second end portion 92 further into the second sleeve 82 such that the second end portion 92 does not extend to the inboard rearward opening 72. The second end portion 92 is rigidly connected to the front side member 30 forward of the body attachment structure 42 via removable fasteners $F_2$. The fasteners $F_2$ extend through apertures in the first end portion 90 and through the exposed portion of the second sleeve 82. Since the second sleeve 82 is welded to the front side member 30, the second end portion 92 of the off-center impact structure 12 is connected to the front side member 30.

The first end portion 90 is attached to the front side member 30 at a location forward of the body attachment structure 42. The second end portion 92 is attached to the front side member 30 at a location rearward of the body attachment structure 42. The main section 94 extends around and outboard of the body attachment structure 42. Further, the off-center impact structure 12 is completely spaced apart from the body attachment structure 42 having a non-contacting relationship with the body attachment structure 42.

The reinforcement member 86 is attached to the main section 94 of the main body 84 of the off-center impact structure 12 adjacent to the first end portion 90. The reinforcement member 86 can be a single panel shaped element or can be constructed from two separate elements, a first shell 96 and a second shell 98 that are welded to one another and welded to the main body 84 of the off-center impact structure 12. The reinforcement member 86 has a flat an impact surface 86a that defines an angle $\alpha_1$ relative to an outboard surface of the outboard wall 62. The angle $\alpha_1$ can range anywhere between 25 and 70 degrees, as shown in FIG. 9. In the depicted embodiment, the angle $\alpha_1$ is 55 degrees.

Figure 14:
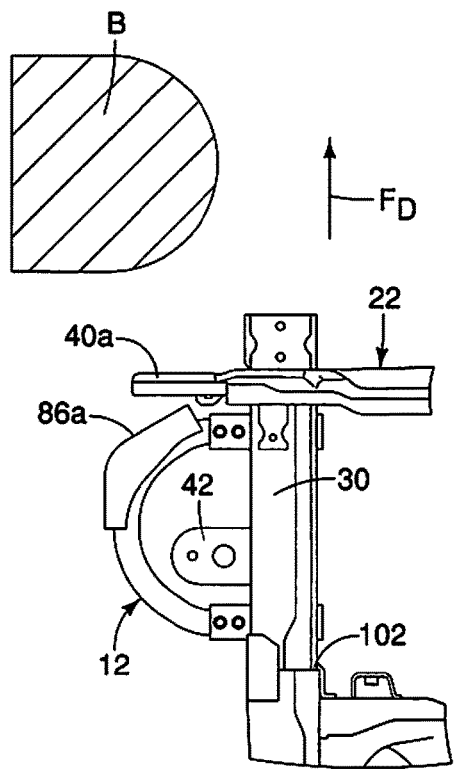
FIG. 14 is a schematic view of the vehicle and the off-center impact structure being subjected to a small overlap test where approximately 25 percent of the front of the vehicle aligned with the fixed, rigid barrier for eventual impact with the barrier in accordance with a first embodiment.
Figure 15:
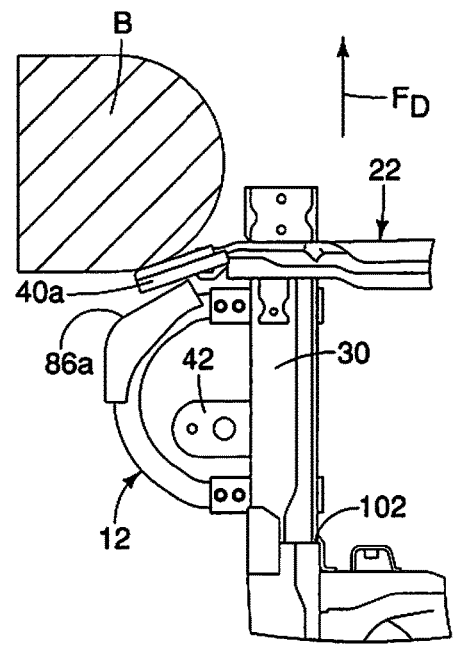
FIG. 15 is another schematic view of the vehicle depicted in FIG. 14 showing an initial response to the impact event of the small overlap test with the off-center impact structure impacting the barrier and beginning to undergo deformation in accordance with the first embodiment.
Figure 16:
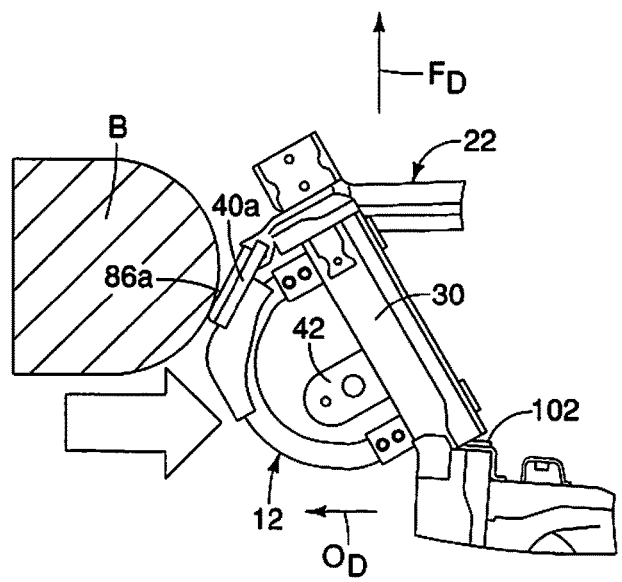
FIG. 16 is still another schematic view of the vehicle depicted in FIGS. 14 and 15 showing a subsequent response to the impact event of the small overlap test with the off-center impact structure undergoing further deformation during the impact event in accordance with the first embodiment.

As shown in FIGS. 14-16, the off-center impact structure 12 can be configured to provide a very specific response. First, during an impact event of a small overlap impact test, the vehicle 10 is moved toward the barrier B at a predetermined velocity (FIG. 14). Initially, the barrier B impacts the outboard portion 40a of the front cross-member 40 of the frame 22 (FIG. 15). The outboard portion 40a is configured to bend or otherwise deform and move into contact with the reinforcement member 86 either in the vicinity of or directly against the impact surface 86a (FIG. 15). Thereafter, the barrier B directly contacts the impact surface 86a. Due to the inclined orientation of the impact surface 86a, when the vehicle 10 impacts the barrier B in a small overlap impact test, the vehicle 10 can be pushed laterally as shown in FIGS. 4-6. Further, depending upon the speed of the impact event during the small overlap impact test, the barrier B and the impact surface 86a can make contact, as shown in FIG. 15. As the impact event continues (milli-seconds later) as shown in FIG. 16, the impact force of the impact event acting on the off-center impact structure 12 can cause a breakaway joint 102 in the front side member 30 to yield, causes the first portion 30c (a frond section) of the front side member 30 to deform in the lateral outboard direction $O_D$. The deforming action of the first portion 30c causes transmittance of impact energy to the frame 22 to further push the frame 22 and the vehicle laterally away from the barrier B.

Second Embodiment

Figure 17:
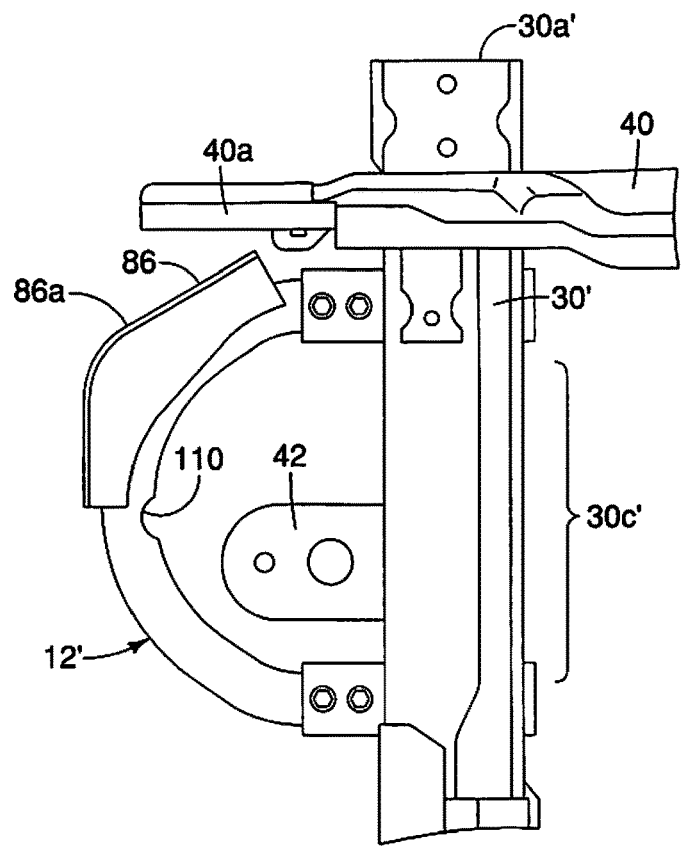
FIG. 17 is a view of an off-center impact structure just prior to being subjected to a small overlap test in accordance with a second embodiment.
Figure 18:
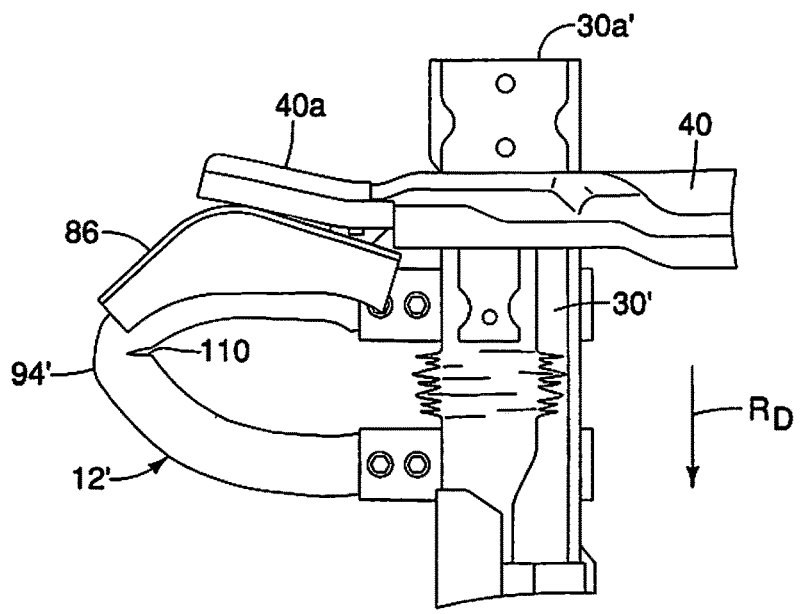
FIG. 18 is another view of the off-center impact structure depicted in FIG. 17 showing the off-center impact structure and frame structure deformed in response to the impact event of the small overlap test in accordance with the second embodiment.

Referring now to FIGS. 17 and 18, an off-center impact structure 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The off-center impact structure 12' is identical to the off-center impact structure 12 of the first embodiment, including many of the elements of the off-center impact structure 12 of the first embodiment. However, in the second embodiment, the front side member 30 of the first embodiment is replaced with a modified front side member 30' that includes a front end 30a' and a first portion 30c', replacing the front end 30a and the first portion 30c of the first embodiment. The modified front side member 30' is configured to collapse in a rearward direction $R_D$ elements being modified. Specifically, the modified front side member 30' is configured to collapse in an accordion manner upon receiving impacting forces, as depicted in FIG. 18. Otherwise, the modified front side member 30' is identical to the front side member 30 of the first embodiment, including the outboard and inboard forward openings, and the outboard and inboard rearward openings as described above with respect to the first embodiment.

The off-center impact structure 12' includes all of the structural features described above with respect to the first embodiment such as the first sleeve 80, the second sleeve 82, and the main body 84. However, in the second embodiment, a main section 94' of the main body 84 has been modified to include a relief notch 110 on an inboard surface of a central area of the main body 84 of the off-center impact structure 12'.

The relief notch 110 is provided in order to direct a very specific deformation response from the off-center impact structure 12' during a full lap impact test where a barrier impacts the vehicle 10 at a point forward of the front side member 30'. Specifically, in response to an impact event with the fixed full lap barrier B (not shown in FIGS. 17 and 18), the off-center impact structure 12' collapses bending in the area of the relief notch 110, as shown in FIG. 18. Simultaneously, the modified front side member 30' collapses in an accordion-like manner, absorbing impact energy.

In the second embodiment, although not shown in FIG. 18, the body attachment structure 42 can be deformed by the impact event and can move vertically or can be compressed by the deformation of the main body 84.

Third Embodiment

Figure 19:
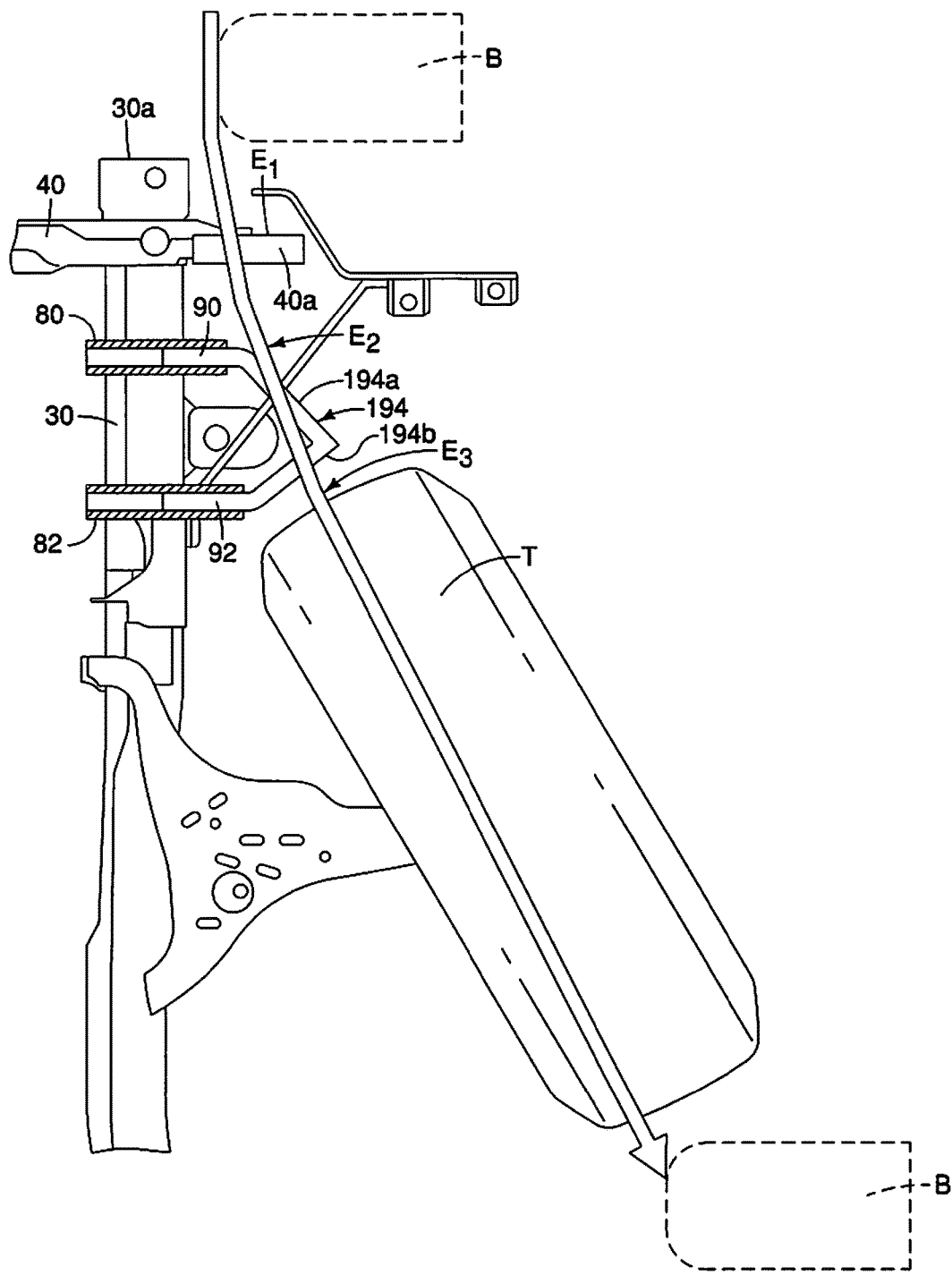
FIG. 19 is a schematic bottom view (looking upward) at an off-center impact structure during a small overlap test in accordance with a third embodiment.
Figure 20:
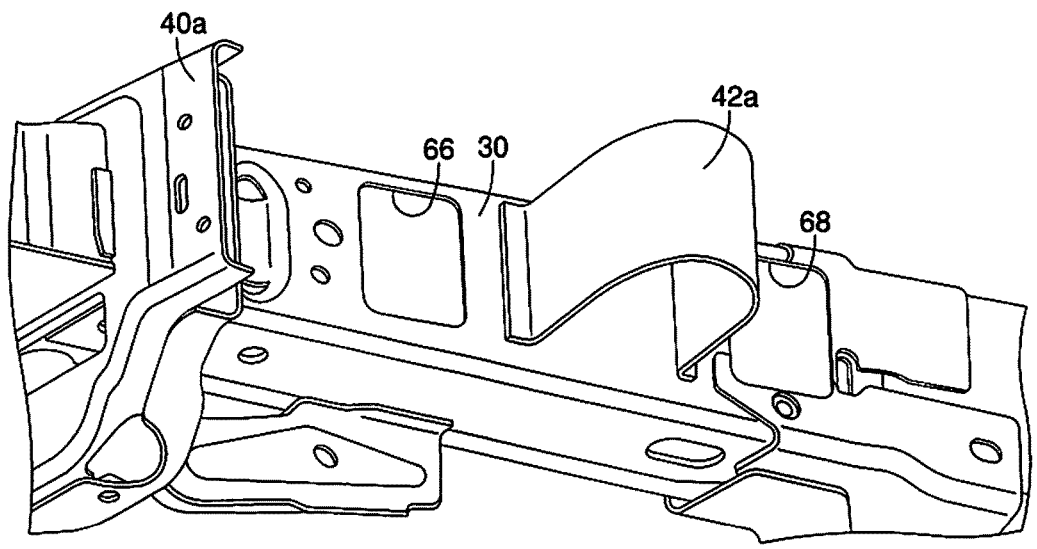
FIG. 20 is a perspective view of a driver's front side of the frame with portion of the off-center impact structure removed in accordance with the third embodiment.
Figure 21:
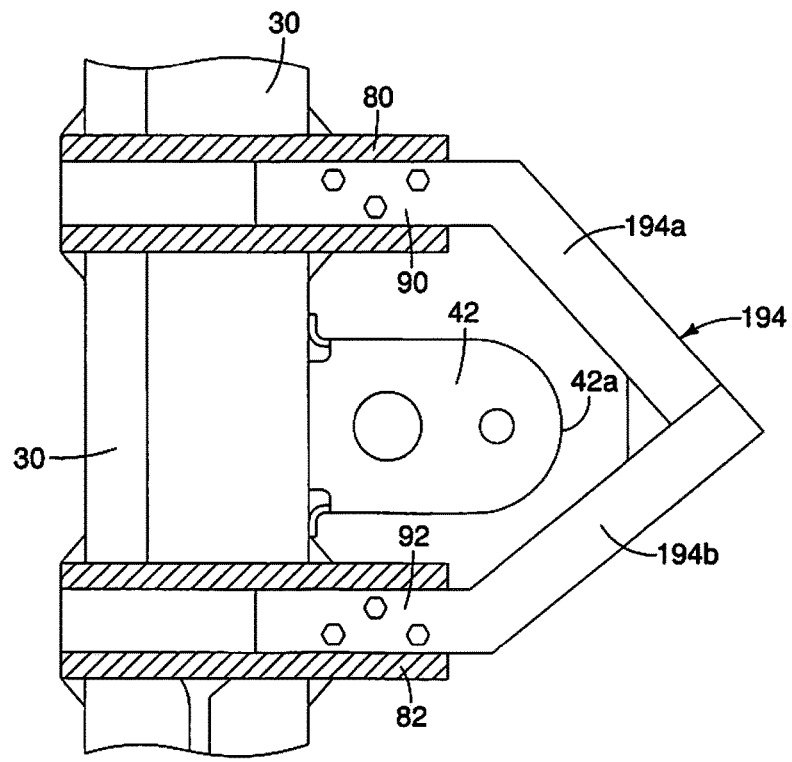
FIG. 21 is another bottom view of the frame structure and the off-center impact structure in accordance with the third embodiment.

Referring now to FIGS. 19-21, an off-center impact structure 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the front side member 30 is as described with respect to the first embodiment. However, the body attachment structure 42 is modified to include a skirt or wall section 42a that extends further downward relative the depiction of the body attachment structure 42 in the first embodiment. The off-center impact structure 112 of the third embodiment also includes the first sleeve 80 and the second sleeve 82 as described above with respect to the first embodiment.

In the third embodiment, the off-center impact structure 112 has a main body 184 that includes the first end portion 90 and the second end portion 92 as described above in the first embodiment. However, in the third embodiment, the main section 94 of the first embodiment is replaced with a main section 194 that includes a first elongated projection 194a and a second elongated projection 196 that have distal ends welded together at a location outboard of the body attachment structure 42. The first elongated projection 194a and the second elongated projection 196 are hollow beams, as in the first embodiment but instead of partially encircling the body attachment structure 42, the first elongated projection 194a and the second elongated projection 196 extend to a point outboard of the body attachment structure 42. In all of the embodiments described herein, the first end portion 90 and the second end portion 92 are parallel to one another. The first elongated projection 194a is angularly offset from the first end portion 90 by an angle of between 125 degrees and 145 degrees. In the depicted embodiment, the angle between the first elongated projection 194a and the first end portion 90 is approximately 135 degrees. Similarly, the second elongated projection 196 is angularly offset from the second end portion 92 by an angle of between 125 degrees and 145 degrees. In the depicted embodiment, the angle between the second elongated projection 194b and the second end portion 92 is also approximately 135 degrees.

Hence, the main section 194 of the off-center impact structure 112 such that corresponding distal ends of the first elongated projection 194a and the second elongated projection intersect 194b and are fixedly attached to one another at a location outboard of and spaced apart from the body attachment structure 42.

As shown in FIG. 19, there are three phases of impact during an impact event in the third embodiment. The first phase $E_1$ occurs when the barrier B (not shown in FIG. 19) impacts the outboard portion 40a of the front cross-member 40. The second phase $E_2$ occurs when the barrier B impacts the first elongated projection 194a which defines an impact surface. The third phase $E_3$ occurs when the barrier B impacts the tire T. During the impact event, the vehicle 10 and the frame 22 are moved laterally away from the barrier B.

The various vehicle elements depicted above, other that the off-center impact structures and modifications to the frame described above, are conventional components that are well known in the art. Since vehicle elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes hardware that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a front side member having a front end and a front-section extending rearward from the front end, the front side member defining a hollow interior and extending in a vehicle longitudinal direction, the front side member having an outboard wall and an inboard wall with an outboard forward opening extending through the outboard wall to the hollow interior;
   a body attachment structure attached to the outboard wall of the front side member along the front-section rearward of the outboard forward opening; and
   an off center impact structure having a first end portion, a second end portion and a main section extending from the first end portion to the second end portion, the first end portion extending through the outboard forward opening and into the hollow interior of the front side member and being rigidly connected to the front side member forward of the body attachment structure, the second end portion being attached to the front side member at a location rearward of the body attachment structure and the main section extending around and outboard of the body attachment structure.

2. The vehicle body structure according to claim 1, wherein
   the off-center impact structure is spaced apart from the body attachment structure having a non-contacting relationship therewith.

3. The vehicle body structure according to claim 1, wherein
   the inboard wall of the front side member defines an inboard forward opening aligned with the outboard forward opening relative to a lateral direction of the front side member with the first end portion of the off-center impact structure being fixedly coupled to the inboard wall proximate the inboard forward opening.

4. The vehicle body structure according to claim 1, wherein
   the outboard wall of the front side member has an outboard rearward opening that extends to the hollow interior of the front side member, with the second end portion of the off-center impact structure extending though the outboard rearward opening and into the hollow interior.

5. The vehicle body structure according to claim 4, wherein
   the inboard wall of the front side member has an inboard rearward opening aligned with the outboard rearward opening with the second end portion extending through the hollow interior and toward the inboard rearward opening with the second end portion being fixedly coupled to the inboard wall.

6. The vehicle body structure according to claim 3, further comprising
   a first sleeve that extends through the outboard forward opening, the hollow interior and through the inboard forward opening, the first sleeve being fixedly attached to the outboard wall and the inboard wall with the first end portion extending into the first sleeve, the first end portion being directly attached to the first sleeve.

7. The vehicle body structure according to claim 6, wherein
   the first sleeve is welded to the outboard wall and welded to the inboard wall.

8. The vehicle body structure according to claim 6, wherein
   the first end portion is directly attached to the first sleeve via removable fasteners.

9. The vehicle body structure according to claim 6, wherein
   the outboard wall of the front side member has an outboard rearward opening that extends to the hollow interior of the front side member, with the second end portion of the off-center impact structure extending though the outboard rearward opening and into the hollow interior.

10. The vehicle body structure according to claim 9, wherein
the inboard wall of the front side member has an inboard rearward opening aligned with the outboard rearward opening with the second end portion extending through the hollow interior and toward the inboard rearward opening with the second end portion being fixedly connected to the inboard wall.

11. The vehicle body structure according to claim 10, further comprising
a second sleeve that extends through the outboard rearward opening, the hollow interior and through the inboard rearward opening, the second sleeve being fixedly attached to the outboard wall and the inboard wall with the first end portion extending into the second sleeve.

12. The vehicle body structure according to claim 11, wherein
the second sleeve is welded to the outboard wall and welded to the inboard wall.

13. The vehicle body structure according to claim 11, wherein
the second end portion is directly attached to the second sleeve via removable fasteners.

14. The vehicle body structure according to claim 1, wherein
the main section of the off-center impact structure has a semicircular shape that arcuately extends from the first end portion to the second end portion.

15. The vehicle body structure according to claim 14, wherein
the main section of the off-center impact structure includes a reinforcement member attached to a forward area of the main section adjacent to the first end portion, the reinforcement member having a flat impact surface that defines a first angle relative to an outboard surface of the outboard wall, the angle being between 30 and 70 degrees.

16. The vehicle body structure according to claim 14, wherein
the main section of the off-center impact structure includes a relief notch located at a central area of an inboard surface of the main section.

17. The vehicle body structure according to claim 1, wherein
the main section of the off-center impact structure has a first elongated projection that extends in an outboard and rearward direction from the first end portion and a second elongated projection that extends in an outboard and forward direction from the second end portion such that corresponding distal ends of the first elongated projection and the second elongated projection intersect and are fixedly attached to one another.

18. The vehicle body structure according to claim 1, further comprising
a front cross member attached to the front end of the front side member having an outboard portion that extends from the front side member forward of the off-center impact structure such that in response to an impact event of an off-center impact test, the outboard portion of the front cross member deforms contacting the off-center impact structure and further causing the front section of the front side member to break away from a rearward portion of the front side member or deform in an outboard direction relative to the rearward portion of the front side member pushing the front side member in a lateral direction away from an area of impact.

* * * * *